United States Patent [19]
Chase

[11] 3,956,833
[45] May 18, 1976

[54] VEHICLE SIMULATOR BINOCULAR MULTIPLANAR VISUAL DISPLAY SYSTEM

[75] Inventor: Wendell D. Chase, Saratoga, Calif.

[73] Assignee: The United States of America as represented by the United States National Aeronautics and Space Administration, Washington, D.C.

[22] Filed: Sept. 13, 1974

[21] Appl. No.: 505,881

[52] U.S. Cl. .............................. 35/12 N; 178/7.89; 178/DIG. 35
[51] Int. Cl.² .......................................... G09B 9/08
[58] Field of Search ................. 35/10.2, 12 N, 12 R, 35/12 K, 11 R, 11 A, 25; 40/33, 34; 178/7.89, 6.5, DIG. 35; 272/8 M, 8.5, 13; 350/174, 144, 189, 196, 204, 304; 352/102, 109–111, 116, 119, 120; 353/12, 122

[56] References Cited
UNITED STATES PATENTS

| | | | |
|---|---|---|---|
| 2,132,476 | 10/1938 | Holm | 272/13 X |
| 2,374,566 | 4/1945 | Tanaka | 350/144 X |
| 3,448,208 | 6/1969 | Chisnell et al. | 178/6.5 |
| 3,549,803 | 12/1970 | Becht et al. | 178/7.89 X |
| 3,659,920 | 5/1972 | McGlasson | 35/12 N X |
| 3,694,558 | 9/1972 | Eisenberg et al. | 35/12 N X |
| 3,711,826 | 1/1972 | Russa | 35/12 N X |

FOREIGN PATENTS OR APPLICATIONS

| | | | |
|---|---|---|---|
| 606,250 | 3/1926 | France | 352/111 |

OTHER PUBLICATIONS

Walker, B.; "On Stereoscopic Viewers"; *Optical Spectra;* Dec. 1970; p. 34.

Primary Examiner—Richard J. Apley
Assistant Examiner—Vance Y. Hum
Attorney, Agent, or Firm—Darrell G. Brekke; Armand G. Morin, Sr.; John R. Manning

[57] ABSTRACT

An aircraft simulator for affording practice in landing maneuvers and the like. A cathode ray tube (CRT) produces an image corresponding to the runway which image changes in response to the trainee's manipulation of controls. The CRT image is projected along an optical path to a screen that is visually accessible to the trainee. Interposed in the optical path are optical elements such as mirrors which are spaced from one another along the optical path so as to create virtual images on the screen that appear to be at different distances from the trainee. The optical elements are sequentially interposed in the path and circuits are provided for synchronizing the production of the CRT image with one of the optical elements so that the image on the screen appears to the trainee to have a range corresponding to the environment being simulated by the CRT image.

14 Claims, 11 Drawing Figures

Fig-3

Fig_4A

Fig_4B

Fig_4C

Fig_5

Fig_6A

Fig_6B

VEHICLE SIMULATOR BINOCULAR MULTIPLANAR VISUAL DISPLAY SYSTEM

The invention described herein was made by an employee of the United States Government, and may be manufactured and used by or for the government for governmental purposes without payment of any royalties thereon or therefor.

Background of the Invention

1. Field of the Invention

This invention relates to vehicle simulators and more particularly to aircraft simulators which provide improved images that afford a three dimensional aspect without necessitating goggles or like attachments.

2. Description of the Prior Art

Among the known prior art U.S. Pats. that disclose devices for generating a television display for a simulator are Nos. 3,560,664; 3,659,920; and 3,670,426. A prior art apparatus for producing calligraphic displays for vehicle simulators is known as the Evans and Sutherland LDS-2. Although the devices disclosed in the above identified prior art have produced useful simulators, they fail to afford to the trainee the three dimensional clues which satisfy the requirements of second order psychological factors of convergence and accommodation.

SUMMARY OF THE INVENTION

The present invention provides an image that simulates the environment in which a vehicle typically operates wherein the image is formed at one of a plurality of virtual image planes that reside at an apparent distance from the operator's station of the simulator that corresponds to the distance of the image in the real world. For example, in simulating the final approach of an aircraft to a runway, the image of the runway at the beginning of the approach is displayed in a plane corresponding to infinity whereas at or immediately before touchdown the runway is displayed at a plane corresponding to approximately 20 feet. Intermediate stages of the final approach maneuver are displayed at apparent distances between the above extremes.

According to the invention there is interposed in the optical path between a CRT display and the viewing screen in the simulator apparatus one of a plurality of optical elements, such as mirrors, that are positioned at different distances from the viewing screen. By circuitry provided according to the invention the particular optical element interposed in the path is synchronized with the image formed on the CRT face so as to give a more realistic presentation to the person using the simulator apparatus. When the scene is viewed with binocular vision a very compelling binocular stereo effect will be perceived and this effect has been found to satisfy the second order psychological factors which are necessary for the subconscious perception of depth.

The principal object of the present invention is to improve the correlation between a relatively inexpensive simulator apparatus and a relatively expensive vehicle (e.g. aircraft) so that trainees can more quickly transfer simulator experience to vehicle experience. This object is achieved according to the present invention by presenting to the trainee an image simulating the environment in which the vehicle operates which image is at an apparent distance that corresponds to the distance of a similar view in a real life situation. Implementation of this object is effected according to the present invention by sequentially interposing a plurality of optical elements in an optical path between the CRT image and the trainee viewing screen and by synchronizing a particular optical element with the image created on the screen.

A feature and advantage of the present invention is that a compelling binocular stereo effect is created without requiring the trainee to wear abnormal filters, glasses or head attachments. Thus the trainee will experience changes of accommodation and convergence when looking at the simulated scene or various portions of it in the manner as would occur in the real world. Moreover, the trainee's eye movements between instruments and the simulated scene will correspond closely to similar movements in the real world thereby enhancing the value of training in the simulator.

A further object of the present invention is to provide a system for generating a computer compatible signal corresponding to each of the optical elements and to couple such signal to the apparatus employed in forming the CRT image. The identifying signal is useful whether the CRT image is formed via television scanning techniques or via calligraphic generated images.

The foregoing together with other objects, features and advantages will be more apparent after referring to the following specification and accompanying drawings:

DESCRIPTION OF THE PREFERRED EMBODIMENTS

Figures 1, 2A, 3A:
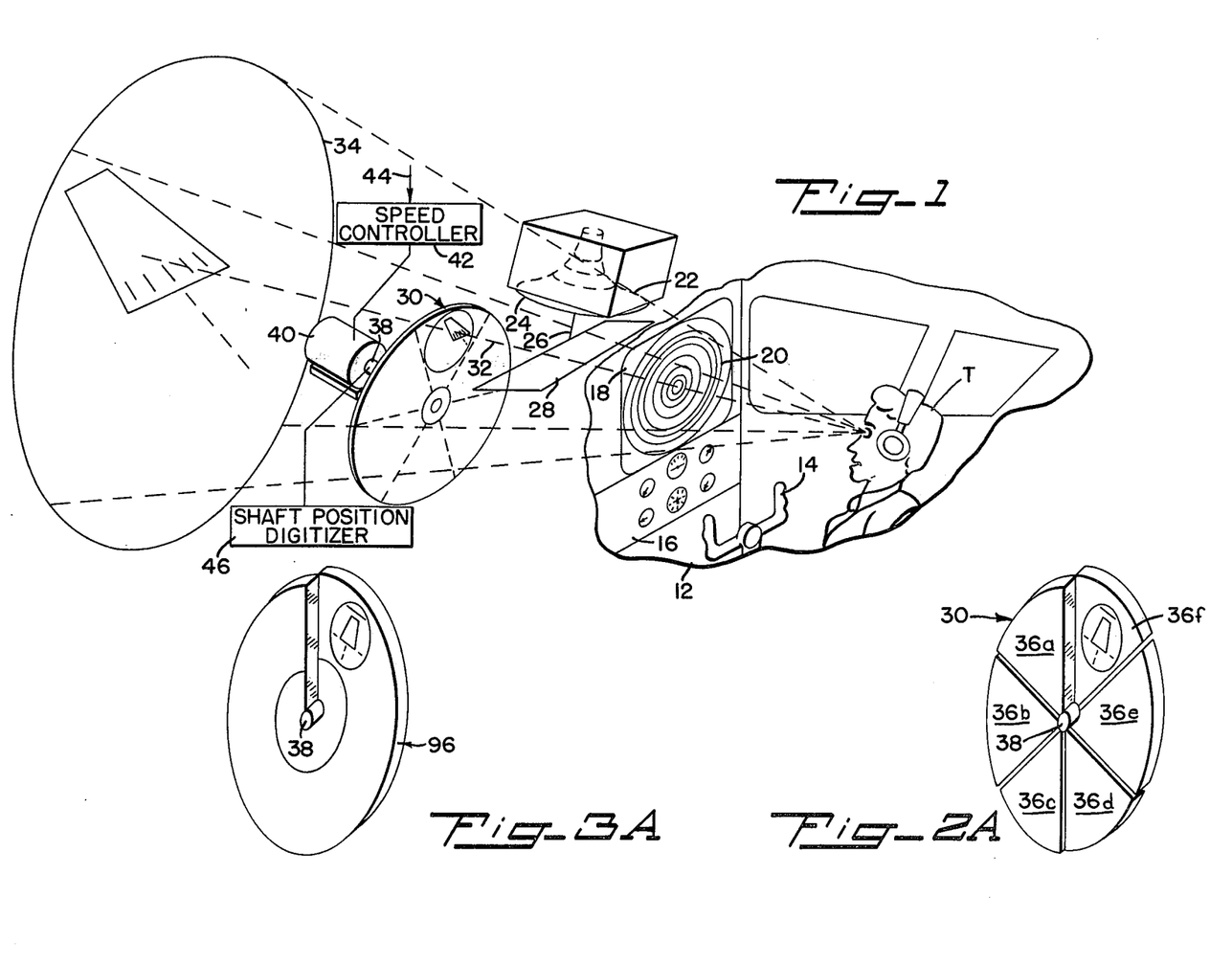
FIG. 1 is a diagrammatic perspective view of an aircraft simulator employing the present invention.
FIG. 2A is a detailed perspective view of an optical element capable of producing images at different ranges as employed in FIG. 2.
FIG. 3A is a detailed perspective view of an alternate form of optical element employed in the embodiment of FIG. 3.
Figure 2:
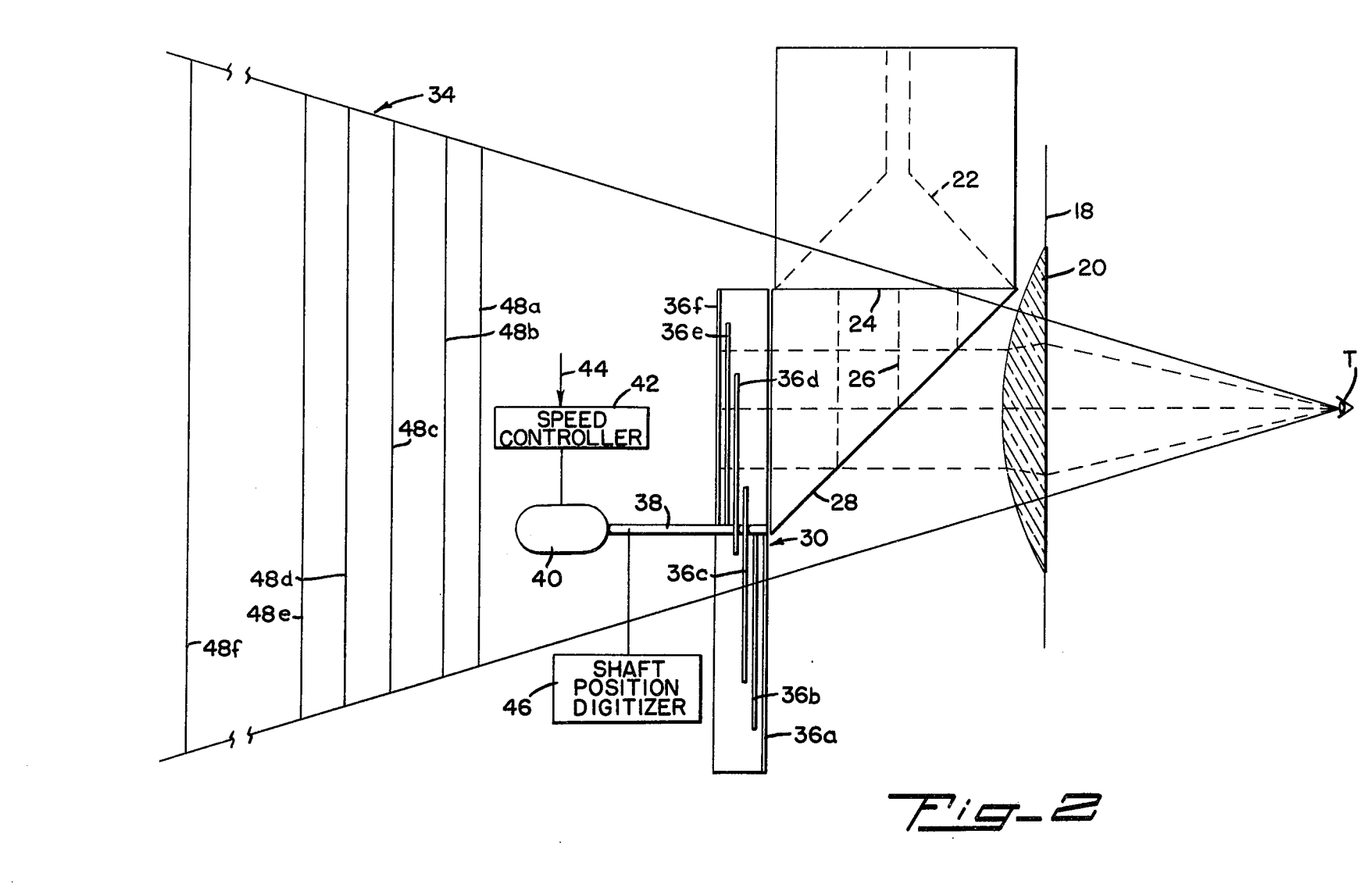
FIG. 2 is a schematic side elevation view of the system in FIG. 1.

Referring more particularly to the drawings, reference numeral 12 indicates a fragment of a simulator enclosure in which a trainee T sits. Enclosure 12 simulates a vehicle such as an airplane and includes a control yoke 14 and a simulated instrument panel 16. In front of the trainee T is a simulated windshield 18 centrally of which is fixed a collimating lens 20 which as seen in FIG. 2, for example, is a plano-convex lens. An image simulating the environment in which the vehicle would normally operate is formed on collimating lens 20 and for this purpose there is a cathode ray tube (CRT) 22 having a face 24 on which the image is formed by any suitable technique such as conventional television or computer generated calligraphic signals. The image on screen 24 is projected along an optical path 26 through a 50% reflectance – 50% transmission reverse position beam splitter 28 and then to a high reflectivity optical element exemplified by a mirror structure 30. The image is then reflected along an optical path 32 to collimating lens 20 on which the image is viewed by the trainee T. The optical parameters of the system are such that the virtual image produced by optical element 30 is at an apparent distance from collimating lens 20 different from the actual distance, the location of the apparent image being indicated at 34.

Optical element 30, in one embodiment of the invention, is formed of a plurality of sector shaped mirror elements 36a, 36b, 36c, 36d, 36e and 36f. The sector shaped elements are arranged in a circular configuration concentric with a central shaft 38 which is driven by a variable speed motor 40. Associated with motor 40 is a speed controller 42 which has a signal input terminal 44 for receiving an electrical signal having an analog or digital magnitude indicative of the desired speed for motor 40. Operatively connected to shaft 38 is a shaft position indicator or digitizer 46 which is a conventional item and can take the form for example of six fixed photo sensitive diodes and a slotted plate that rotates with shaft 38 to illuminate one of the diodes for each of the six shaft positions. In one structure designed according to the present invention the shaft position, i.e. the output of digitizer 46 is in grey code according to the following table:

| | |
|---|---|
| 0 0 0 0 | Sector A (0–59°) |
| 1 0 0 0 | Don't write |
| 0 0 0 1 | Sector B (60–119°) |
| 1 0 0 1 | Don't write |
| 0 0 1 1 | Sector C (120–179°) |
| 1 0 1 1 | Don't write |
| 0 1 1 1 | Sector D (180–239°) |
| 0 1 1 0 | Don't write |
| 1 1 1 1 | Sector E (240–299°) |
| 0 1 0 1 | Don't write |
| 0 1 0 0 | Sector F (300–359°) |
| 0 0 1 0 | Clear |

The table illustrates that the digitizer produces a unique identifying signal which identifies which of the sectors is disposed in the optical path between CRT face 24 and collimating lens 20. Also produced is a "don't write" signal for blanking the CRT image at those times that optical element 30 is in a transition stage, i.e., when a boundary between adjacent sectors is disposed in the optical path. The "don't write" signal also indicates the beginning of the time period during which a given sector is interposed in the optical path. The grey code signal is used to synchronize the rotative position of optical element 30 with the image formed on CRT face 24. It is well known that when an object is placed x meters in front of a mirror, the virtual image of the object is situated x meters behind the mirror. Inasmuch as the mirror elements 30 occupy different planes, the virtual images resulting from an object placed in front of these mirrors (such as an object created by a CRT) will also occupy different planes. The apparent images that are created on collimating lens 20 in response to interposition of the different sectors in the optical path appear at different apparent distances from the trainee. Such images are indicated in FIG. 2 at 48a, 48b, 48c, 48d, 48e and 48f, the reference letter in the reference characters enumerated above corresponding to similarly identified sectors in the above table.

Figure 4A:
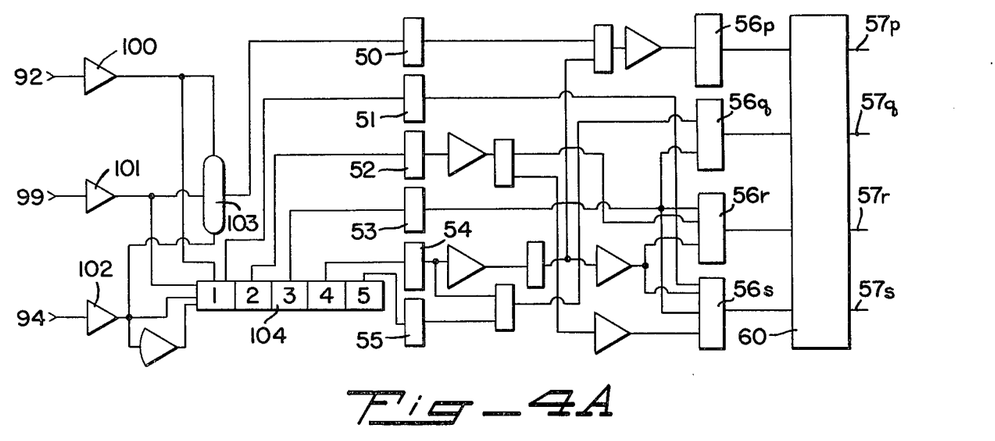
FIGS. 4A, 4B and 4C form a block diagram of a gating circuit according to the present invention which functions to effect synchronization between the optical element, the computer that generates a calligraphic signal, and the CRT image.

With reference to FIG. 4A, three signals are generated from shaft position digitizer 46. The signals are identified as "Don't Write", "Increment", and "Sync", a timing diagram of the signals being shown in FIG. 5 and the signals being identified respectively at 92, 94 and 99. The pulses for "Don't Write" signal 92 are fed to a detection amplifier 100; the pulses for "Increment" 94 are fed to a detection amplifier 102, and the "Sync" signal 99 are fed to a detection amplifier 101. The outputs of detection amplifiers 100 and 101 are fed to a flip-flop 103 which in turn is used to set up sector 36a of the display by activating a gate 50.

The "Increment" and "Sync" pulses, when fed through detection amplifier 102 and 101 are used to set up a shift register 104 to act as a counter. As succeeding "Increment" pulses indicate a change of the position of the mirror sectors 36b through 36f, the output of the shift register will send corresponding signals to gates 51 through 55 to set up the correct position grey code. The outputs of gates 50 – 55 feed a plurality of intermediate gates, including gates 56p, 56q, 56r and 56s, which in turn feed a 4 bit slice card or register 60 for converting the output of the intermediate gates to a grey code as listed above in the table. The output of the grey code register circuit 60 appears at terminals 57p, 57q, 57r and 57s. Such outputs feed the top half of a 4 bit comparator 71 (see FIG. 4C), whereby the comparator receives a signal uniquely identifying a particular sector 36 that is in the optical path. Such identifying signal is compared with the output of a range selecting register 70 (see FIG. 4B), which is substantially identical to register circuit 60.

Figure 4B:
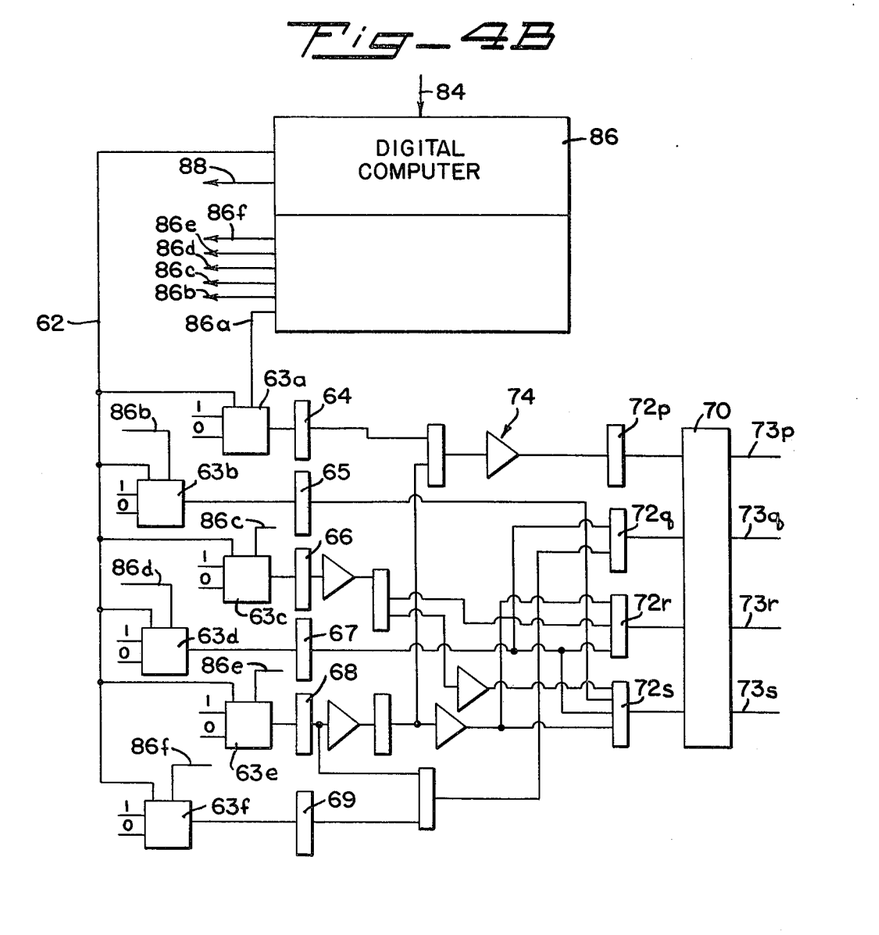

Range selecting register 70 constitutes the output of a range selecting circuit 74. The range selecting circuit has an input terminal 62 to which is connected a signal generated by a digital computer 86. The computer generated signal connected to input terminal is indicative of the simulated range of the image produced on collimating lens 20 and is produced by a conventional device such as the Evans & Sutherland LDS-2 simulator. Production of the signal supplied to input terminal 62 will be described in more detail hereinbelow, it being sufficient for the present to appreciate that the signal varies in accordance with the manipulation by trainee T of control yoke 14 and similar controls in enclosure 12 that correspond to a throttle and rudder pedals. Range selecting circuit 74 has a plurality of logic level comparator switches 63a, 63b, 63c, 63d, 63e and 63f which compare the signal on the input terminal 62 with either fixed or computer generated signals 86a, 86b, 86c, 86d, 86e and 86f, respectively. The magnitude of the latter signals bears a relation to the parameters of the optical system, to the relative locations of the optical elements 36a – 36f, and to the maneuver being simulated. Thus, only one of the logic level comparator switches 63 will be "on" at any given time. The identity of the logic level comparator switch that is "on" depends on the magnitude of the input signal to terminal 62 compared with the fixed or computer generated range signal 86a – 86f. Intermediate gating stages 64 – 69 further process the range signal, and the signal is ultimately converted to a grey code via a grey code conversion gating circuit composed of elements 72p, 72q, 72r and 72s. The outputs of gates 72 constitute the inputs to range selecting register 70. The output of circuit 74 is connected to the bottom half of a 4 bit comparator 71 for comparison with the output of register circuit 60. The grey code output of register 70 appears at terminals 73p, 73q, 73r and 73s which terminals are connected to comparator 71 (FIG. 4C) and specifically to AND gates 75p, 75q, 75r and 75s for gating with the output of register 60 to form comparison signals. The outputs of register circuits 60 and 70 are fed through gates 75 to gates 77p, 77q, 77r and 77s and thence to an AND gate 78, the output 80 of which constitutes the output of comparator 71. The signal at output 80 is "on" only when the desired image range on register 70 coincides with interposition in the optical path, as determined by register 60, of the corresponding optical element sector 36. The "on" signal at output 80 is employed to turn on CRT 22 by unblanking the video amplifier 22a therein. For example, the signal at terminal 80 can be connected to the cathode circuitry of the CRT to turn on the cathode ray beam to face 24 only when the image range and an optical element 36 correspond to one another.

Figures 4C, 5, 6A, 6B:
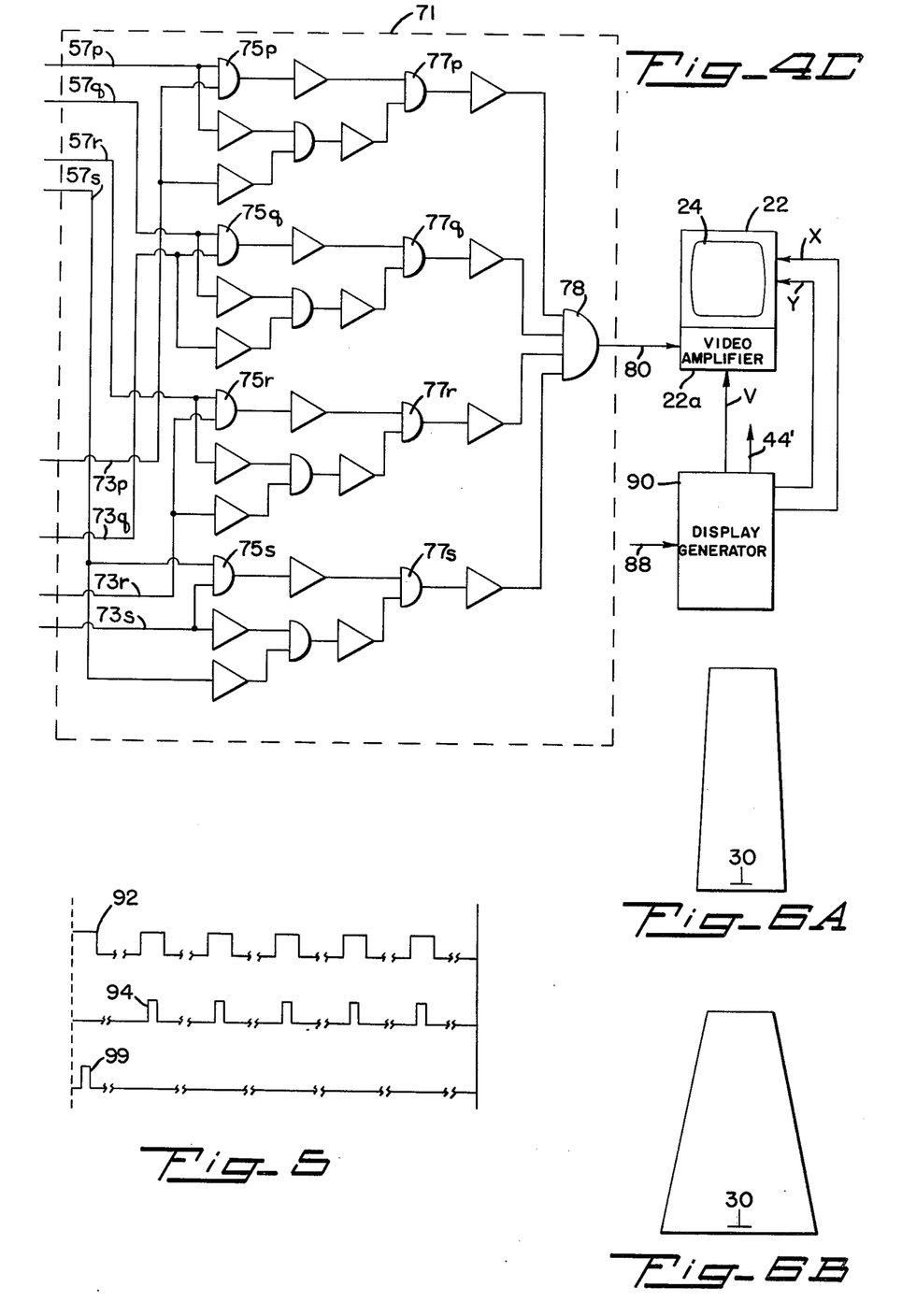
FIG. 5 is a partial timing diagram illustrating the cooperation between various parts of a system embodying the invention.
FIG. 6A is a view of an aircraft runway as seen in a simulator at the beginning of final approach maneuver.
FIG. 6B is a view of the aircraft runway of FIG. 6A at a later time in the final approach maneuver.

The right hand portion of FIG. 4C shows in block form a conventional image generation circuit which produces a calligraphic image, as opposed to a television image, on CRT face 24. The upper left hand portion of FIG. 4B shows in block form the computer that controls the image generator in accordance with the maneuver being simulated and the trainee's response to the scene appearing on CRT face 24. In the latter Figure response by trainee T to the image projected from the CRT to collimating lens 20 is manifested by his manipulating the controls, such as yoke 14 to produce an analog or digital signal on a transmission line 84 which is inputted to a digital computer 86. The digital computer, exemplified as a part of the above mentioned Evans and Sutherland LDS-2, computes the effects of the trainee's control manipulation and feeds a signal over a transmission line 88 to a calligraphic display generator 90. The outputs of display generator 90 appear on the deflection inputs X and Y and the video input of the CRT; display generator 90 computes such factors as matrix rotation, matrix manipulation and viewpoint or perspective of the scene. Comparator 71 is controlled by digital computer 86 so that a signal is fed therefrom on output 80 only when the desired image range and the correct optical element 36a – 36f coincide.

Because of the versatility of the digital computer control circuitry, either the entire image can be projected during the time that one optical element 36a – 36f is interposed in the optical path or various parts of an image can be reflected by various optical elements 36a – 36f when different parts of the image are intended to reside at different ranges with respect to the vehicle. In order to achieve synchronization of the rotative speed of the optical elements, calligraphic display generator 90 has an output 44' which is connected to input 44 of speed controller 42.

In one system designed according to the present invention motor 40 is variable between 20 and 60Hz, the rate of rotation depending on the repetition rate of refreshing the image on CRT face 24 as controlled by display generator 90. For synchronizing the repetition rate of refreshing the image on CRT face 24, the "Don't Write" signals from grey code register 60 are employed as shown in FIG. 5 to generate blanking signals 92 in order that generation of the image on face 24 is not initiated until after the boundary between adjacent optical elements 36a –36f pass the optical path. Moreover, a timing or "Increment" signal 94 is similarly generated from the register so as to establish the start time for producing the image as well as the repetition rate between sequential productions of the CRT image.

In the timing diagram of FIG. 5, the time interval between adjacent pulses 92 and 94 is indicated as being variable. Such is the case because the speed of rotation of motor 40 is variable. With a six sector optical element 30, the time interval between adjacent pulses is about 8.3 milliseconds (ms) at 20 Hz and about 2.8 ms at 60 Hz. This permits accommodation of the system of this invention to various types of calligraphic display systems in various modes of operation of such systems. For example, each whole frame of the CRT image can be reflected from a single sector 36 or different parts of a single image frame can be reflected from two or more different sectors 36.

The operation of the apparatus of the invention can be appreciated by considering simulation of a landing maneuver. At the beginning of the maneuver, corresponding to commencement of the final approach to a runway, computer 86 and display generator 90 cooperate to produce an image on CRT face 24 that corresponds to that shown in FIG. 6A. The display generator also functions to time production of the image with the time that optical element 36f is interposed in the optical path so that the image of FIG. 6A viewed in collimating lens 20 appears to reside in a remote plane with respect to the simulator enclosure 12. As the trainee manipulates the controls, thereby producing a signal along transmission line 84, digital computer 86 and display generator 90 cooperate to produce a different image on CRT face 24. As the approach maneuver continues the distance between the aircraft and the runway decreases and display generator 90 simulates this by producing an image on CRT face 24 while optical element 36e is interposed in the optical path. As the distance lessens the image is timed for sequential reflection by optical element 36d, 36c, 36b in turn and finally optical element 36a. In the case of an aircraft simulator, the latter optical element is preferably arranged to produce a signal that appears to be spaced about 20 feet from the enclosure 12, a condition existing in a large aircraft at touchdown. FIG. 6B indicates the image produced on CRT face 24 at a closer range: for example, the image shown in FIG. 6B is timed by display generator 90 to be reflected along the optical path by optical element 36 c and represents a range intermediate infinity and 20 feet. Consequently, because the shape of the image on CRT face 24 as well as the apparent distance of the image from collimating lens 20 continually change, a much more realistic simulation of the maneuver is afforded so that the time spent by the trainee in the simulator can be more readily transferred to performance in the real world.

Figure 3:
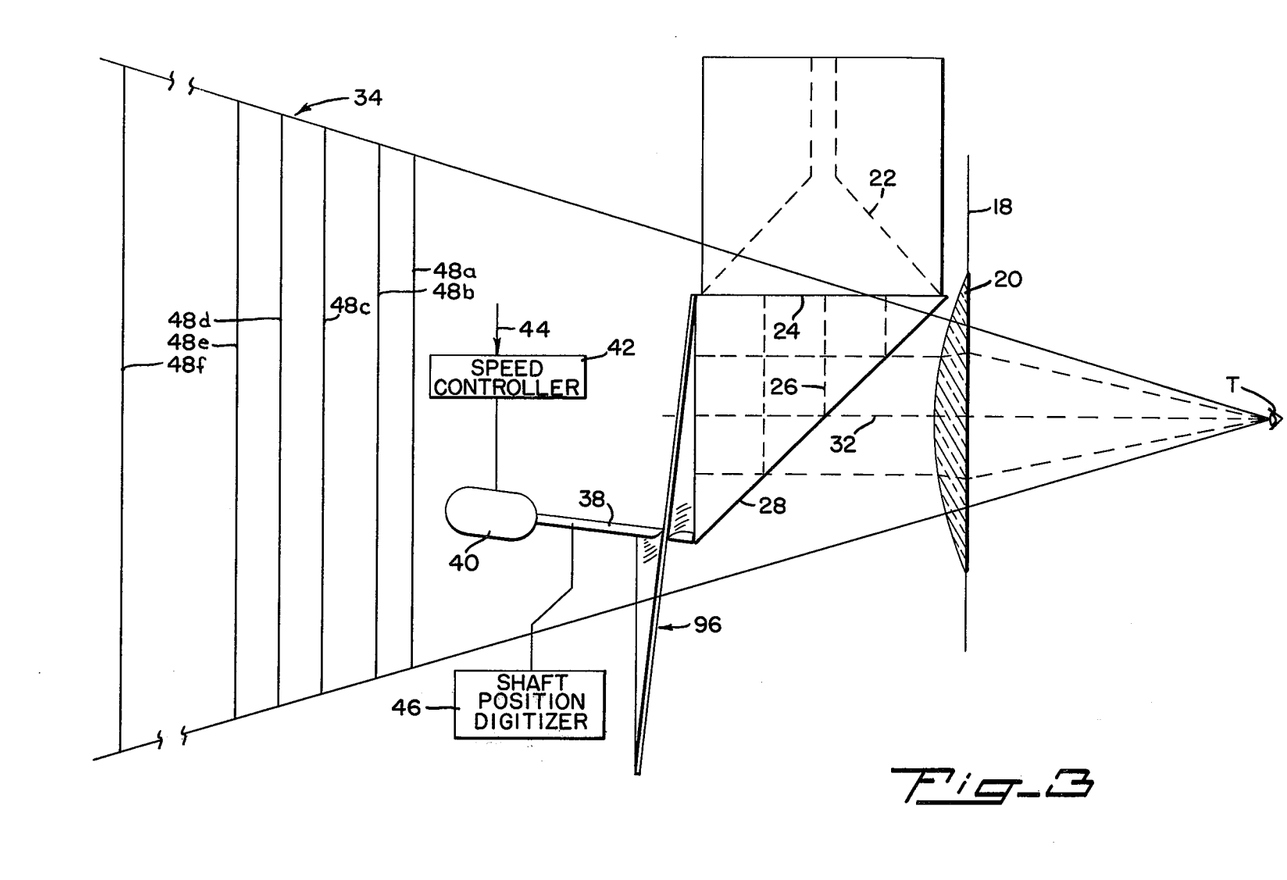
FIG. 3 is a schematic side elevational view of an alternate embodiment of the invention.

Optical element 30 can take the form of a continuous reflective surface rather than a plurality of discrete optical elements. Such alternate optical element is identified at 96 in FIGS. 3 and 3A. Because optical element 96 is substantially interchangeable with the system heretofore described in connection with FIG. 1 the same characters of reference are employed in FIG. 1. Optical element 96 has a continuous optical surface that resides in oblique relation to optical path 32 so that in response to rotation of the element, the reflective surface that intersects the optical path moves toward and away from collimating lens 20. Although discrete apparent images 48a, 48b, 48c, 48e, and 48f **α°are shown in FIG. 3 it will be appreciated that optical element 96 can produce images at a greater or lesser number of distances and at different distances. The distance of the apparent image is controlled by the timing of the "Don't Write" signal 92 and the increment pulses 94 shown in FIG. 6. The presentation achieved with the embodiment of FIG. 3 is substantially similar to that described hereinabove in connection with FIG. 1 because only a portion, e.g. 60°, of optical element 92 is employed in reflecting any individual image from the CRT face to collimating lens 20.

The apparatus of the invention can also be employed in systems in which CRT 22 produces a television image, rather than a calligraphic image, on face 24. In this case, detection amplifier 101 is adapted to utilize its sync signal 99 (FIG. 5) which is then fed to the television vertical sweep circuitry. Motor speed controller 42 is adjusted so as to drive motor 40 and shaft 38 at 60 Hz which corresponds with the repetition rate of the vertical sync pulse of a conventional television system. A vertical sync signal 99 replacing the internal television sync signal initiates creation of the CRT image at the proper time relative to the rotational position of the optical elements 30 or 96. Because a television system typically forms 60 images per second, at a two to one interlace, the interval between adjacent sync pulses 99 is set at 16.67 ms (16.67 = 1/60 Hz) by adjusting motor 40 to rotate at 60 Hz. Both optical elements 30 and 92 can be employed with a television system to achieve improved realism of the image displayed on screen 20.

Thus is will be seen that the present invention provides a vehicle simulator which affords a more realistic view which satisfied the trainee's second order psychological effects. The apparatus of the invention can be employed with aircraft simulators or any other vehicle simulators and can be used in training aircraft control tower operators in simulators of that type. Although two embodiments have been shown and described, it will be apparent that other adaptations and modifications can be made without departing from the true spirit and scope of the invention.

What is claimed is:

1. In apparatus for simulating movement of a vehicle in an environment wherein there is variation in the range between the vehicle and the environment and wherein the apparatus is of the type that includes an operator's station, a beam splitter, means for projecting a CRT image on the beam splitter that simulates a view of the environment from the vehicle, a fixed optical path visually accessible from the station which passes obliquely through said beam splitter and coincides with the CRT image reflection path from the beam splitter, at least one control manipulable from the operator's station, and means responsive to manipulation of the control for altering the CRT image projected on the beam splitter to simulate relative movement between the vehicle and the environment consequent upon the manipulation, the improvement comprising a plurality of optical image forming elements, each optical image forming element representing a different range between said vehicle and said environment, each element forming a virtual image at a different apparent distance from the beam splitter, means for sequentially interposing said elements in the optical path, means for generating an identifying signal for identifying which of said elements is interposed in the optical path, and means responsive to said identifying means for activating that part of the CRT image that corresponds in range to the optical element interposed in the optical path.

2. Apparatus according to claim 1 wherein said image forming elements comprise mirror surfaces spaced at different distances from said beam splitter.

3. Apparatus according to claim 2 including means or supporting said mirror surfaces in a circular configuration concentric of a central axis, and wherein said sequential interposing means comprises means for revolving said supporting means about said axis.

4. Apparatus according to claim 2 wherein said mirror surfaces are formed by discrete elements having reflective surfaces disposed substantially normal to said optical path.

5. Apparatus according to claim 2 wherein said mirror surfaces are defined by portions of a substantially continuous mirror surface disposed obliquely of said optical path.

6. Apparatus according to claim 5 wherein said substantially continuous surface is of circular configuration relative a central axis, said central axis being oriented obliquely of said optical path, and wherein said sequential interposing means includes means for revolving said continuous surface about said axis.

7. In apparatus for simulating movement of a vehicle in an environment wherein there is a variation in the range between the vehicle and the environment and wherein the apparatus is of the type which includes an operator's station, said apparatus comprising a beam splitter, a CRT, means coupled to said CRT for generating an image on said CRT that simulates a view of the environment from the vehicle, means for positioning said CRT so that said CRT image is projected onto said beam splitter, a fixed optical path visually accessible from the station which passes obliquely through said beam splitter and which coincides with the CRT image reflection path from said beam splitter, at least one control manipulable from said operator's station, means responsive to manipulation of said control for altering said CRT image projected on said beam splitter to simulate relative movement between the vehicle and the environment consequent upon manipulation, a plurality of mirror surfaces spaced at different distances from said beam splitter, each mirror surface representing a different range between said vehicle and said enviroment, each of said surfaces forming a virtual image at a different apparent distance from said beam splitter, means for supporting said mirror surfaces in a circular configuration concentric of a central axis, means for sequentially interposing said surfaces in said optical path, said sequential interposing means comprising means for revolving said supporting means about said central axis, means for generating an identifying signal for identifying which of said elements is interposed in said optical path, means responsive to said identifying means for activating that part of said CRT image that corresponds in range to said mirror surface interposed in said optical path, said identifying signal generating means comprising means responsive to revolution of said revolving means for generating a series of first coded signals each of which has a magnitude corresponding to and identifying one of said mirror surfaces, means for generating a second coded signal corresponding to the range of the CRT image, means for gating said first and second coded signals to produce a CRT enable signal only when the first coded signal coincides with the second coded signal, and means for connecting said CRT enable signal to said CRT so as to form a CRT image on the beam splitter at an appropriate apparent distance therefrom.

8. Apparatus according to claim 7 wherein there is a boundary intermediate adjacent said mirror surfaces and wherein said digitizing means includes means for generating a "Don't Write" signal when said boundary is interposed in said optical path and means for operatively connecting said "Don't Write" signal to said CRT so that an image is produced only after said boundary is interposed in said optical path.

9. Apparatus according to claim 7 wherein said CRT image is formed by a television sweep signal that is initiated by substituting a vertical sync signal and wherein said digitizing means includes means for generating a vertical sync signal for each said mirror surface, said apparatus having gating means for gating said vertical sync system to said CRT only when a mirror surface having a range corresponding to the CRT image range is interposed in said optical path.

10. Apparatus for simulating the movement of a vehicle in an environment wherein there is a relative motion between the vehicle and the environment and wherein the apparatus is of the type including an operator station, said apparatus comprising:
a CRT,
at least one control manipulable from the operator's station;
means responsive to the manipulation of said control for generating an image on said CRT which is representative of a view of said environment as observed from said vehicle;
an optical element having a plurality of mirror elements in different planes, each mirror element representing a different distance between said vehicle and said environment;
means for projecting said CRT image along a fixed optical path which is viewable from said operator's station;
means for sequentially interposing said mirror elements in said optical path whereby each mirror element generates a virtual image at a different distance from said CRT;
means for generating an identifying signal for identifying which of said elements is interposed in said optical path; and
means responsive to said identifying means for activating that part of said CRT image that corresponds in range to the mirror element interposed in said optical path.

11. Apparatus according to claim 10 including means for supporting said mirror elements in a circular configuration concentric of a central axis, and wherein said sequential interposing means comprises means for revolving said supporting means about said axis.

12. Apparatus according to claim 11 wherein said identifying signal generating means comprises digitizing means responsive to revolution of said revolving means for generating a series of first coded signals each of which has a magnitude corresponding to and identifying one of said mirror elements, means for generating a second coded signal corresponding to the range of the CRT image, means for gating said first and second coded signals to produce a CRT enable signal only when said first coded signal coincides with said second coded signal, and means for connecting said CRT enable signal to said CRT.

13. Apparatus according to claim 12 wherein there is a boundary intermediate said mirror elements and wherein said digitizing means includes means for generating a "Don't Write" signal when said boundary is interposed in said optical path, and means for operatively connecting said "Don't Write" signal to said CRT so that an image is produced only after said boundary is interposed in said optical path.

14. Apparatus according to claim 13 wherein said CRT image is formed by a television sweep signal that is initiated by substituting a vertical sync signal and wherein said digitizing means includes means for generating a vertical sync signal for each said mirror element, said apparatus also having gating means for gating said vertical sync system to said CRT only when a mirror element having a range corresponding to the CRT image range is interposed in said optical path.

* * * * *